United States Patent [19]

Upatnieks et al.

[11] 3,854,900

[45] Dec. 17, 1974

[54] SEPARATION OF MIXTURES OF CHLORINE DIOXIDE AND CHLORINE

[75] Inventors: Guntars I. Upatnieks; Gerald Cowley, both of Mississauga, Ontario, Canada

[73] Assignee: ERCO Industries Limited, Islington, Canada

[22] Filed: Nov. 20, 1973

[21] Appl. No.: 417,613

[52] U.S. Cl. ........................................ 55/51, 55/71
[51] Int. Cl. ............................................ B01d 55/14
[58] Field of Search ............... 55/48, 51, 71, 93, 94, 55/223, 68; 423/477, 503

[56] References Cited
FOREIGN PATENTS OR APPLICATIONS
38-10   9/1963   Japan ..................................... 55/71

Primary Examiner—Charles N. Hart
Attorney, Agent, or Firm—Sim & McBurney

[57] ABSTRACT

The proportion of chlorine dioxide to chlorine in aqueous solutions formed from gaseous mixtures of chlorine dioxide and chlorine is improved over conventional separation techniques. The gaseous mixture is contacted by a hot aqueous solution of chlorine dioxide and chlorine saturated with respect to chlorine, resulting in preferential dissolving of the chlorine dioxide from the gas mixture. The hot aqueous solution is formed by contacting the chlorine gas mixture from the first contacting step with water to dissolve out the remaining chlorine dioxide and heating the resulting aqueous solution. In a further embodiment, the proportion of chlorine in the chlorine dioxide solution may be reduced further by stripping the solution with an inert gas.

10 Claims, 1 Drawing Figure

3,854,900
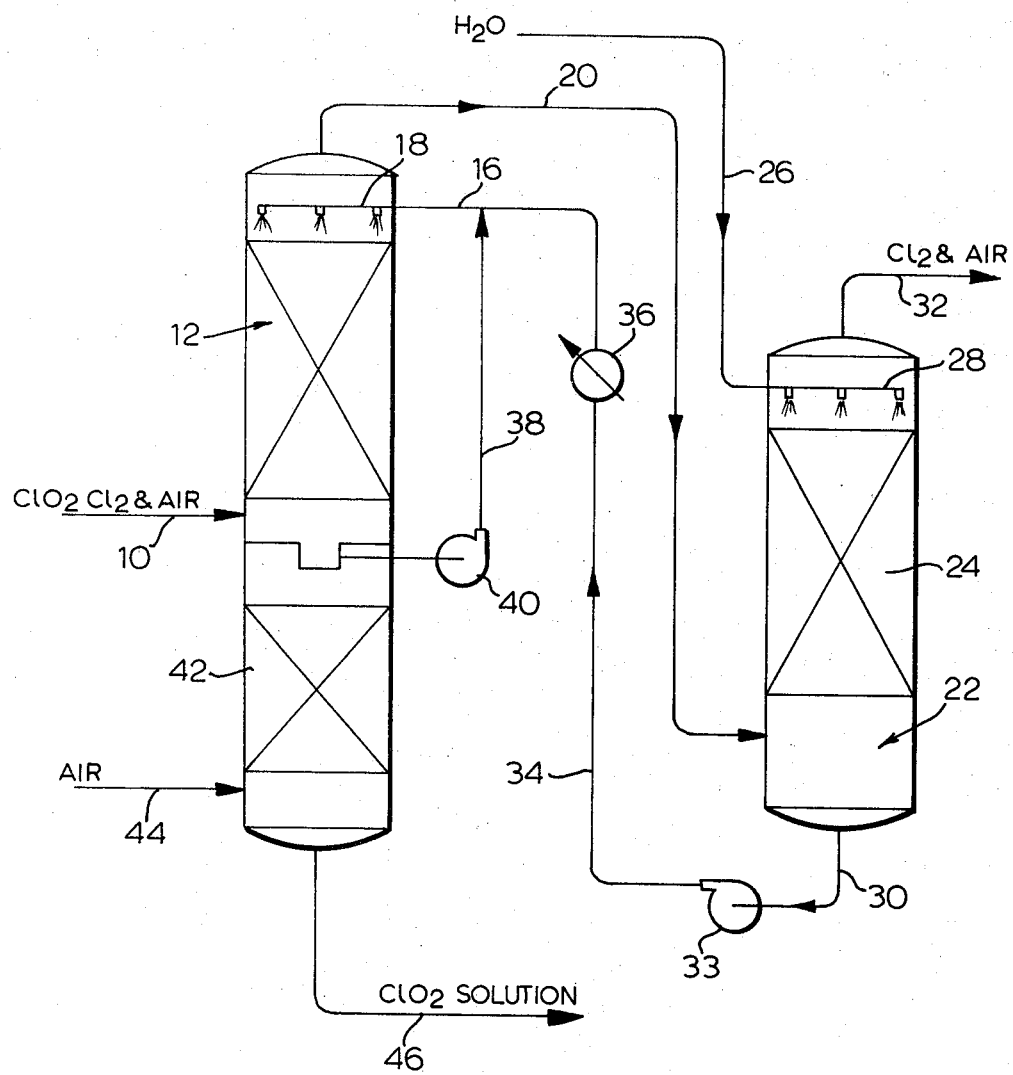

SEPARATION OF MIXTURES OF CHLORINE DIOXIDE AND CHLORINE

FIELD OF INVENTION

The present invention relates to the separation of gaseous mixtures of chlorine dioxide and chlorine.

BACKGROUND TO THE INVENTION

Chlorine dioxide, which is used in bleaching operations, typically in the bleaching of cellulosic fibrous material pulps, may be formed in many different ways, generally involving the reduction of a chlorate by chloride in an acid medium. The chlorine dioxide usually is used in the form of an aqueous solution thereof.

The base reaction involved in such processes is summarized by the equation:

$$ClO_3^- + Cl^- + 2H^+ \rightarrow ClO_2 + {}_+Cl_2 + H_2O$$

Commonly, the formation of chlorine dioxide involves the reduction of an alkali metal chlorate with alkali metal chloride in an acid medium containing sulphuric acid or other strong mineral acid. In this process, where the alkali metal is sodium the reaction is represented by the equation:

$$NaClO_3 + NaCl + H_2SO_4 \rightarrow ClO_2 + \tfrac{1}{2}Cl_2 + H_2O + Na_2SO_4$$

An alternative process involves the reduction of alkali metal chlorate in hydrochloric acid, the hydrochloric acid providing both the reductant and the acid medium. This process, where the alkali metal is sodium, is represented by the equation:

$$NaClO_3 + 2HCl \rightarrow ClO_2 + \tfrac{1}{2}Cl_2 + H_2O + NaCl$$

The gaseous chlorine dioxide produced in these processes therefore is obtained in admixture with chlorine. In view of the explosive nature of chlorine dioxide in high concentrations, the gaseous mixture of chlorine dioxide and chlorine usually is diluted with an inert gas, such as, air or steam. In the latter case, the steam is produced by maintaining the reaction mixture at its boiling point, generally at a reduced pressure.

There are, however, many operations wherein chlorine dioxide is required as an aqueous solution having only a minor proportion of dissolved chlorine.

Existing separation methods reduce the chlorine content, typically initially at about 56 percent of the total of chlorine and chlorine dioxide in the gaseous mixture, to about 20 percent of the total of chlorine and chlorine dioxide in the aqueous solution resulting from contacting the gaseous mixture with water to dissolve the chlorine dioxide and part of the chlorine. However, a chlorine content of this level is undesirable in many uses of aqueous solutions of chlorine dioxide.

SUMMARY OF INVENTION

It has now been found, in accordance with the present invention, that an enhanced efficiency of separation of chlorine dioxide and chlorine may be achieved, resulting in an aqueous solution of chlorine dioxide which contains a lower proportion of chlorine than achieved by conventional procedures.

In accordance with one embodiment of the invention, a gas mixture containing chlorine dioxide and chlorine is subjected to countercurrent contact with an aqueous solution of chlorine dioxide and chlorine substantially saturated with respect to chlorine and having a temperature greater than that of the gas mixture in order to dissolve chlorine dioxide from the gaseous mixture and hence recovering a solution wherein the proportion of chlorine dioxide to chlorine is increased and forming a gaseous mixture having an increased chlorine proportion. The latter gas mixture is subjected to countercurrent contact with water to dissolve chlorine dioxide therefrom and a gaseous material containing chlorine and substantially free of chlorine dioxide is recovered. An aqueous solution of chlorine dioxide and chlorine recovered from the latter contact is heated and passed to the first countercurrent contacting step.

In accordance with a further embodiment of the invention, the aqueous solution of chlorine dioxide and chlorine having a decreased chlorine proportion resulting from the procedure of the first embodiment, omitting the heating step, if desired, is subjected to countercurrent contact with an inert gas, thereby stripping chlorine and chlorine dioxide from the aqueous solution, and resulting in an aqueous solution having a further reduced proportion of chlorine.

BRIEF DESCRIPTION OF DRAWING

The sole accompanying drawing is a schematic flow sheet illustrating the present invention.

DESCRIPTION OF PREFERRED EMBODIMENTS

In the drawing, a gas mixture containing chlorine dioxide and chlorine in admixture with an inert gas is fed by line 10 to a first separation tower 12. In the embodiment of the invention described with reference to the accompanying drawing, the diluent inert gas is air, but the present invention is applicable to processes where the diluent gas is another inert gas, such as, steam, hydrogen or nitrogen, or mixtures thereof.

The tower 12 may be of any convenient construction to allow intimate gas-liquid contact. The gaseous mixture fed by line 10 rises through a first gas-liquid contact zone 14 wherein the mixture is contacted by a counter-currently-flowing aqueous solution of chlorine dioxide and chlorine fed to the top of the zone 14 by line 16 and header pipe 18, which may be in the form of spray nozzles.

The aqueous solution of chlorine dioxide and chlorine, which usually is saturated with respect to chlorine and hotter than the rising gas, dissolves some of the chlorine dioxide from the gaseous mixture while giving up some of its chlorine content to the gaseous mixture, thereby increasing the proportion of chlorine dioxide in the aqueous phase. The gaseous mixture resulting from contact by the aqueous solution in the first gas-liquid contact zone 14 having a reduced chlorine dioxide and an increased chlorine content passes out of the first tower 12 by line 20 and is passed to a second separation tower 22. The second separation tower 22 may be of any convenient construction and contains a gas-liquid contact zone 24. The gaseous mixture rises in the second tower 22 through the gas-liquid contact zone 24 and is counter-currently contacted with water fed to the tower 22 by line 26 through header 28, which may be in the form of spray nozzles.

The water dissolves from the gaseous mixture fed through line 20, substantially all the chlorine dioxide content thereof, i.e. substantially all the chlorine dioxide not dissolved in the first tower 12 and additionally dissolves some chlorine. The resulting aqueous solution of chlorine dioxide and chlorine leaves the second tower 22 by line 30. The gaseous mixture of air and chlorine resulting from the contacting in the second tower 24 leaves the top of the second tower 24 by line 32 for recovery of chlorine in any convenient manner.

The aqueous solution of chlorine dioxide and chlorine in line 30 is pumped by pump 32 through line 34 to a heater 36. In the heater 36, the aqueous solution is heated preferably to the saturation temperature of the chlorine and chlorine dioxide therein, the temperature usually being about 5 to 10°F higher than the temperature of the gas mixture in line 10. Hence, upon feed of the heated solution to the first tower 12 by line 16 and upon contact thereof with the gaseous mixture fed by line 10, chlorine dioxide dissolves therein from the mixture. In this way, the proportion of chlorine dioxide in the solution is increased.

In order to maintain a high liquid flow rate within the first gas-liquid contact zone 14, a reflux stream 38, in with a reflux pump 40, is provided associated with the first tower 12.

The chlorine dioxide solution which results from this procedure at the base of the gas-liquid zone 14 generally has a chlorine content of about 15 percent of the total of chlorine dioxide and chlorine, representing an improvement over conventional systems. Operation in this manner to obtain this improvement represents one embodiment of the invention.

In accordance with a second embodiment of the invention, this chlorine dioxide solution may be subjected to a further stripping operation in a second gas-liquid contact zone 42 of any convenient construction in the first tower 12. The second gas-liquid contact zone 42 may be provided in a separate tower, if desired. The chlorine dioxide solution is contacted in the second gas-liquid contact zone 24 by air, or other inert gas, fed by line 44, resulting in removal of further quantities of chlorine from the solution, together with some chlorine dioxide.

The resulting chlorine dioxide solution, having a low chlorine content of generally about 10 percent of the total of chlorine dioxide and chlorine, is recovered from the first tower 12 by line 46.

In this embodiment, it will be unnecessary to subject the solution of cholrine dioxide and chlorine in line 20 to heating prior to feed to the first tower 12 by line 16. In the absence of such heating, the residual chlorine content of the chlorine dioxide solution generally is about 10 percent of the total of chlorine dioxide and chlorine. Where such heating is omitted, the first and second towers 12 and 22 may be constituted by a single tower containing the gas-liquid contact zones 42, 14 and 24 located one above another, with the gas-liquid contact zone 42 being the lowest zone.

Alternatively, where such heating is omitted, the first and second towers 12 and 22 may be replaced by two different towers, in the first of which is located the gas-liquid contact zones 14 and 24, one above the other and in the second of which is located the gas-liquid contact zone 42.

In this embodiment of the invention, when external heating in heater 36 is omitted and one of the above-recited features is adopted, it is preferred to employ steam, or a mixture of steam and air, as the diluent gas for the chlorine dioxide and chlorine, the heat which results on condensation of the steam serving to heat the aqueous material in the tower 12.

The air, chlorine and chlorine dioxide mixture passing upwardly out of the second gas-liquid contact zone 42 passes with the gas mixture fed by line 10 into the first gas-liquid contact zone 14.

Alternatively, the air chlorine and chlorine dioxide mixture passing out of the second gas-liquid contact zone 42 may be removed from the first tower 12 before it can pass to the first gas-liquid contact zone 14 and may be passed to the second tower 22 joining the gaseous feed thereto in line 20.

Modifications are possible within the scope of the invention.

What we claim is:

1. A method for the separation of gaseous mixtures of chlorine dioxide and chlorine which comprises:
   feeding a gaseous mixture containing chlorine dioxide and chlorine to a first contacting zone,
   subjecting said gaseous mixture to countercurrent contact in said first contacting zone with an aqueous solution of chlorine dioxide and chlorine substantially saturated with respect to chlorine and having a temperature above that of said gaseous mixture to dissolve chlorine dioxide from said gaseous mixture in said aqueous solution,
   recovering an aqueous solution of chlorine dioxide and chlorine having an increased proportion of chlorine dioxide from said first contacting zone,
   passing the gaseous mixture having a decreased proportion of chlorine dioxide and an increased proportion of chlorine resulting from said coutercurrent contact in said first contacting zone to a second contacting zone,
   subjecting said latter gaseous mixture to countercurrent contact with water to dissolve substantially all the chlorine dioxide and part only of the chlorine, from said latter gaseous mixture,
   removing from said second contacting zone a gaseous material containing chlorine and being substantially free of chlorine dioxide,
   removing from said contacting zone an aqueous solution of chlorine dioxide and chlorine, heating said latter aqueous solution to a temperature greater than that of said gaseous mixture and to the substantial saturation point of chlorine therein and
   passing said heated solution to said first contacting zone as said aqueous solution countercurrently contacting said gaseous mixture.

2. The method of claim 1 wherein said aqueous solution recovered from said first contacting zone is subjected to countercurrent contact with air to remove chlorine and chlorine dioxide therefrom, and the stripped solution having an increased ratio of chlorine dioxide to chlorine therein as compared to said solution resulting from said countercurrent contact in said first contacting zone is recovered.

3. The method of claim 2 wherein the gaseous mixture resulting from said latter air contacting operation is mixed with said gaseous mixture containing chlorine dioxide and chlorine prior to said countercurrent contact in said first contacting zone, whereby the chlorine and chlorine dioxide in said gaseous mixture resulting from said air contacting is subjected to said countercurrent contact in said first contacting zone.

4. The method of claim 2 wherein the gaseous mixture resulting from said latter air contacting operation is passed to said second contacting zone with said gaseous mixture having a decreased proportion of chlorine dioxide.

5. The method of claim 1 wherein said gaseous mixture containing chlorine dioxide and chlorine is a gaseous mixture consisting of chlorine dioxide, chlorine and air.

6. A method for the separation of gaseous mixtures of chlorine dioxide and chlorine which comprises:
feeding a gaseous mixture containing chlorine dioxide and chlorine to a first contacting zone,
subjecting said gaseous mixture to counter-current contact in said first contacting zone with an aqueous solution of chlorine dioxide and chlorine undersaturated with respect to chlorine dioxide to dissolve chlorine dioxide from said gaseous mixture into said aqueous solution,
passing the gaseous mixture having a reduced proportion of chlorine dioxide and an increased proportion of chlorine resulting from said countercurrent contact in said first contacting zone to a second contacting zone,
subjecting said later gaseous mixture to countercurrent contact in said second contacting zone with water to dissolve substantially all the chlorine dioxide and part only of the chlorine from said latter gaseous mixture,
removing from second contacting zone a gaseous material containing chlorine and being substantially free from chlorine dioxide,
passing the aqueous solution of chlorine dioxide and chlorine resulting from said countercurrent contact in said second contacting zone to said first contacting zone as said aqueous solution of chlorine dioxide and chlorine used in said countercurrent contact in said first contacting zone,
remove an aqueous solution of chlorine dioxide and chlorine from said first contacting zone having a higher proportion of chlorine dioxide than said aqueous solution of chlorine dioxide and chlorine used in used countercurrent contact in said first contacting zone,
passing said removed aqueous solution of chlorine dioxide and chlorine to a third contacting zone,
subjecting said removed aqueous solution of chlorine and chlorine to countercurrent contact with an inert gas in said third contacting zone to remove chlorine and chlorine dioxide therefrom,
forwarding the resulting mixture of inert gas, chlorine anc chlorine dioxide to said first contacting zone with said gaseous mixture containing chlorine dioxide and chlorine fed thereto, whereby said chlorine and chlorine dioxide contained in said resulting mixture is subjected to said countercurrent contact in said first contacting zone along with said fed gaseous mixture containing chlorine dioxide and chlorine, and
recovering an aqueous solution of chlorine dioxide and chlorine having an increased proportion of chlorine dioxide as compared to that in said removed aqueous solution of chlorine dioxide and chlorine.

7. The method of claim 6 wherein said inert gas is air and said fed gaseous mixture containing chlorine dioxide and chlorine is a mixture of chlorine dioxide, chlorine, steam and air.

8. The method of claim 6 wherein said first and third contacting zones are located in vertical alignment in a first gas-liquid contact vessel with said first contacting zone being located above said third contacting zone, and said second contacting zone is located in a second gas-liquid contact vessel physically separate from said first gas-liquid contact vessel.

9. The method of claim 6 wherein said first, second and third contacting zones are located in vertical alignment in a single gas-liquid contact vessel, with said second contacting zone being located above said first contacting zone and said first contacting zone being located above said third contacting zone.

10. The method of claim 6 wherein said first and second contacting zones are located in vertical alignment in a first gas-liquid contact vessel with said second contacting zone being located above said first contacting zone, and said third contacting zone is located in a second gas-liquid contact vessel.

* * * * *